United States Patent [19]
Sakai et al.

[11] Patent Number: 5,371,728
[45] Date of Patent: Dec. 6, 1994

[54] INFORMATION RECORDING/REPRODUCING APPARATUS USING PROBE

[75] Inventors: Kunihiro Sakai, Isehara; Katsunori Hatanaka, Yokohama; Takahiro Oguchi, Ebina; Akihiko Yamano; Shunichi Shido, both of Sagamihara, all of Japan

[73] Assignee: Canon Kabushiki Kaisha, Tokyo, Japan

[21] Appl. No.: 25,652

[22] Filed: Mar. 3, 1993

[30] Foreign Application Priority Data

Mar. 7, 1992 [JP] Japan .................. 4-084750

[51] Int. Cl.$^5$ .............................. G11B 9/00
[52] U.S. Cl. ................................. 369/126
[58] Field of Search ............... 369/126; 250/306

[56] References Cited

U.S. PATENT DOCUMENTS 5,015,850 5/1991 Zdeblick et al. ............ 250/306
5,187,367 2/1993 Miyazaki et al. ............ 369/126

FOREIGN PATENT DOCUMENTS 63-161552 7/1988 Japan .
63-161553 7/1988 Japan .

OTHER PUBLICATIONS

G. Binning et al., "Surface Studies by Scanning Tunneling Microscopy", Phys. Rev. Lett., vol. 49, p. 57 (1982).
K. E. Peterson, "Silicon as a Mechanical Material", Proceedings of the IEEE, vol. 70, p. 420 (1982).
G. Binning et al., "Tunneling through a controllable vacuum gap", Appl. Phys. Lett., vol. 40, p. 178 (1982).

Primary Examiner—Constantine Hannaher
Assistant Examiner—Don Wong
Attorney, Agent, or Firm—Fitzpatrick, Cella, Harper & Scinto

[57] ABSTRACT

An information recording/reproducing apparatus effects recording of information by moving a probe close to a recording medium and scanning a surface of the medium parallelly with the probe, reading out information by using a micro signal obtained from a physical phenomenon occurring in the scan. The apparatus is provided with plate electrodes and a capacity detecting device. One of the plate electrodes is formed on a substrate which supports the probe. The other plate electrode is formed on a substrate which supports the recording medium. A capacity between the plate electrodes is detected by the capacity detecting device. A gap between the probe and the recording medium is controlled in accordance with the detection result.

7 Claims, 3 Drawing Sheets

INFORMATION RECORDING/REPRODUCING APPARATUS USING PROBE

BACKGROUND OF THE INVENTION

1. Field of the Invention

The present invention relates to an apparatus in which two-dimensionally scanning is effected on a recording medium using a probe located close to the recording medium to perform recording/reproduction of information by utilizing a physical interaction induced between the recording medium and the probe and, more particularly, to a small, high-density information recording/reproducing apparatus taking advantage of the principle of an STM.

2. Related Background Art

Recently, a scanning tunnel microscope (to be referred to as an STM hereinafter) capable of directly observing the electronic structure of a surface atom of a conductor has been developed (G. Binning et al., Phys. Rev. Lett. 49 (1982) 57), and this makes it possible to measure a real gap image at an extremely high resolution on the order of nm or less regardless of whether the image is single-crystal or amorphous. This STM observes the surface condition of a conductive sample by using a tunnel current that flows when a metal probe and the sample are moved close to each other to a distance of about 1 nm with a voltage applied between them. This current is very sensitive to the change in distance between the probe and the sample. Therefore, the surface condition of the sample can be observed with a resolution on the order of an atom by scanning the probe on the sample with the tunnel current maintained constant and measuring the change in distance between the probe and the sample, or by measuring the change in tunnel current when the scan is performed with the distance maintained constant.

Although the analysis using the STM is conventionally limited to conductive materials, the STM has begun to be applied to an analysis of the structure of a thin insulating film formed on the surface of a conductive material. In addition, as the STM techniques have been developed, a technique has been proposed which measures the surface condition of a sample by scanning a probe on the sample while detecting various physical interactions, not limited to a tunnel current, produced between the probe and the sample that are located very close to each other. An apparatus or means of this type not only has a high spatial resolution but makes use of a method of detecting a micro signal, such as a tunnel current. This brings about an advantage of the ability to observe a sample with a low power without damaging it. Furthermore, since the apparatus can operate in the open atmosphere, extensive applications are expected.

In particular, as disclosed in Japanese Laid-Open Patent Application Nos. 63-161552 and 63-161553, many efforts have been made to use these techniques in high-density recording/reproducing apparatuses. That is, a probe is used to physically deform a recording medium corresponding to a sample or to change the electronic condition on the surface of the recording medium, thereby recording information, and information in a recording bit is reproduced by an electric current flowing between the probe and the recording medium. The use of this method makes it possible to perform recording/reproduction of a large quantity of information at a high density, on the order of a molecule or an atom.

In the above recording method, in order to cause a physical change, a recording probe with a sharp tip is urged against a recording medium to recess it. It is also reported recently that, on a recording medium consisting of, e.g., graphite, very small holes about 4 nm in diameter can be formed by application of a pulse voltage with a peak value of 3 to 8 V and a pulse width of 1 to 100 $\mu$s. These holes are sufficiently usable as recording bits. As a method to perform recording by changing an electronic condition, on the other hand, there is a known method in which a voltage is applied across a recording medium and a probe electrode to change the electrical characteristics of a micro region. This method has attracted attention because it facilitates erasure and rewriting of information. A structure usable as a recording medium is, for example, a thin-film layer of a material that exhibits switching characteristics with a memory effect in a voltage-current characteristic, such as a chalcogenide or a $\pi$ electron-based organic compound. An example is a structure in which a multilayered film of an appropriate organic substance is formed on a base electrode by using a Langmuir-Blodgett method (to be referred to as an LB method hereinafter).

A probe unit is commonly a structure in which a metal needle consisting of, e.g., Pt, Pt-Ir, or W, whose tip is mechanically polished and then electropolished, is attached to a piezoelectric element. In this structure, a displacement is controlled by a voltage applied to the piezoelectric element. Techniques of semiconductor manufacturing processes can also be used. That is, formation of a probe unit having a fine structure is also possible by the use of a processing technique (e.g., K. E. Peterson, "Silicon as a Mechanical Material," Proceedings of the IEEE, Vol. 70, page 420, 1982) that can form fine structures on a single substrate.

In order for an information recording/reproducing apparatus of the above sort to function correctly, it is essential that a probe be located close enough to the surface of a recording medium to produce a physical interaction, such as a flow of a tunnel current, between them. For this purpose, a probe approaching mechanism must be used to approximate the distance between the probe and the recording medium to the distance described above. Conventionally, a stepping motor, an inch worm, or a stacked piezoelectric element is used as this approaching mechanism. The approaching mechanism is controlled by monitoring a signal, such as a tunnel current, detected as a position signal by the probe, thereby approaching the probe to a desired position, as described in (Appl. Phys. Lett., 40 (1982) 178).

The above conventional example, however, has the following problem; a signal from the probe can be detected only within a very limited region, such as a distance of nm or less, in which a physical interaction occurs between the probe and the recording medium. If the prove moves too close, even slightly, to the recording medium, a possibility of collision arises. A collision of the probe not only damages the recording medium but decreases the spatial resolution due to an increase in radius of curvature at the tip of the probe. In the above method and means, therefore, the gain of an approach control system must be set low so that neither overshoot nor ringing occurs in the system. Consequently, it becomes difficult to improve the response speed of control, i.e., to complete the approach of the probe in a short time period.

SUMMARY OF THE INVENTION

It is an object of the present invention to provide an information recording/reproducing apparatus with an approaching mechanism which can approach a probe to a recording medium in a short time and has a high safety and a high controllability.

In order to achieve the above object, an information recording/reproducing apparatus according to the present invention, which moves a probe close to a recording medium, scans the probe parallel to the surface of the recording medium, and reads out information as a micro signal obtained from a physical phenomenon occurring during the scan, thereby performing recording/reproduction of the information with respect to the recording medium, includes opposing plate electrodes arranged independently of the probe on the sides of both the probe and the recording medium, and a capacity detecting means for detecting the capacity between these electrodes.

The information recording/reproducing apparatus with the above arrangement has a distance detection mechanism constituted by a pair or a plurality of pairs of opposing detection plate electrodes, arranged independently of the probe on the sides of both the probe and the recording medium, and the capacity detecting means. The apparatus performs an operation of approaching the probe to the recording medium on the basis of an output signal from this distance detection mechanism.

DETAILED DESCRIPTION OF THE PREFERRED EMBODIMENTS

The embodiments of the present invention will be described in detail below with reference to the accompanying drawings.

Figure 1:
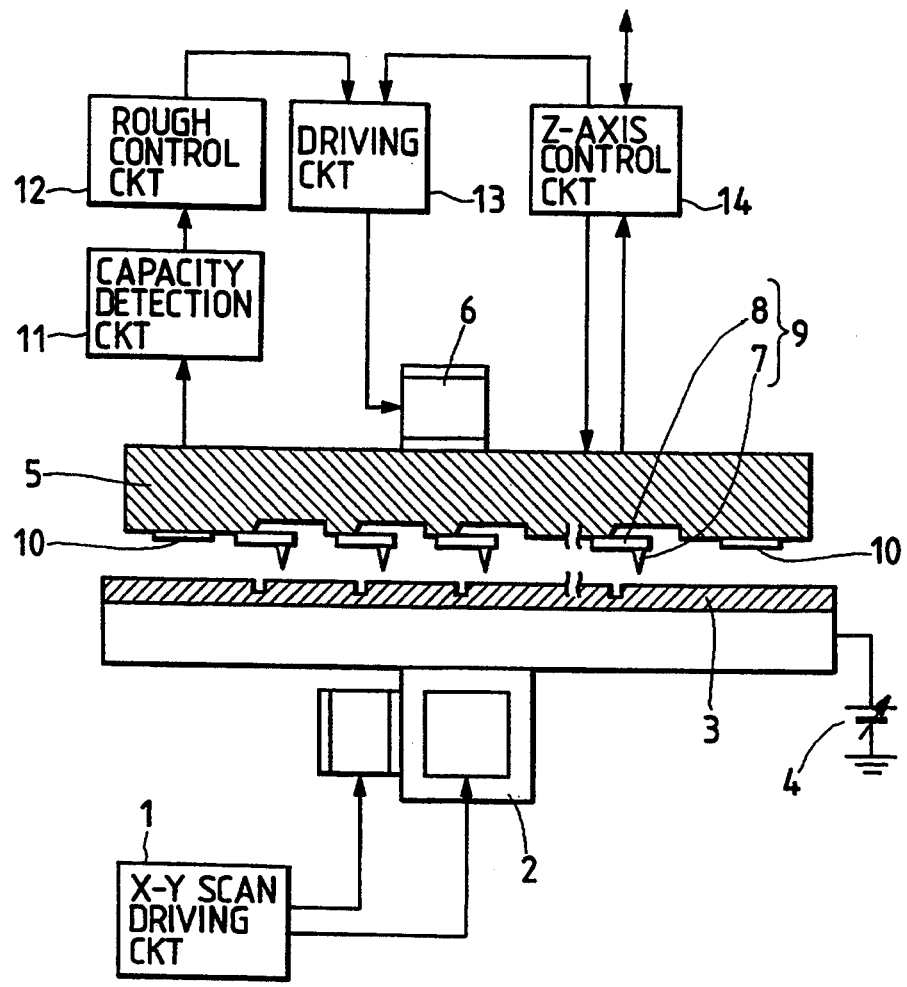
FIG. 1 is a block diagram showing an information recording/reproducing apparatus according to the present invention.

FIG. 1 is a block diagram showing the arrangement of an information recording/reproducing apparatus according to the first embodiment of the present invention. Referring to FIG. 1, a bias power source 4 is connected to a recording medium 3 supported from below by an X-Y scanning mechanism 2 which is controlled by an X-Y scan driving circuit 1. A silicon substrate 5 opposes the recording medium 3. This silicon substrate 5 is supported by a rough adjustment mechanism 6 from the side opposite to the surface opposing the recording medium 3. A plurality of probe units 9, each constituted by a probe electrode 7 and a fine adjustment mechanism 8, are arranged on the surface of the silicon substrate 5, which opposes the recording medium 3. Plate electrodes 10 are also formed on the surface of the silicon substrate 5, that opposes the recording medium 3. An output from the plate electrode 10 is supplied to a driving circuit 13 for driving the rough adjustment mechanism 6 via a capacity detection circuit 11 and a rough control circuit 12. The input and output terminals of the prove unit 9 are connected to a signal detection.Z-axis control circuit 14, and the output of the Z-axis control circuit 14 is connected to the driving circuit 13. The signal detection-Z-axis control circuit 14 is also used in exchanging data with respect to, e.g., an external display unit (not shown).

Note that the capacity detection circuit 11 outputs an electrical signal of a voltage, a pulse width, a frequency, and the like that correspond to a capacity which changes inversely proportional to the gap between the opposing electrodes. The information recording/reproducing apparatus of this embodiment uses this electrical signal to control driving of a Z-axis moving mechanism such that the probe electrode 7 approaches the recording medium 3 to a desired distance, performing an approaching operation. In this approaching operation, a maximum detectable distance depends on the size of the plate electrode 10 and the sensitivity of the capacity detection circuit 11. When, for example, the plate electrode 10 with an electrode area of 0.2 mm$^2$ is used, a gap of 10 $\mu$m or more can be readily measured by using conventionally known techniques. That is, since the approaching operation can be performed in a condition in which an overshoot on the order of $\mu$m is permitted, the response speed is improved.

Figure 2:
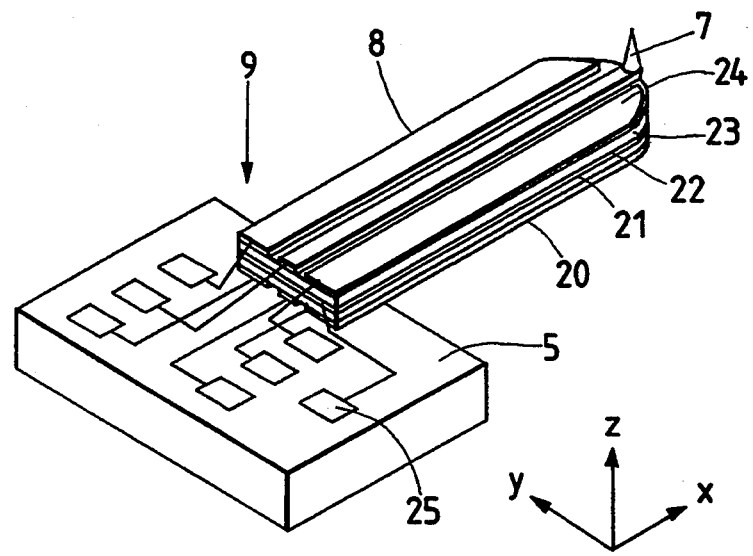
FIG. 2 is a perspective view showing in detail a probe unit of the apparatus shown in FIG. 1.

FIG. 2 is a perspective view showing the probe unit 9 formed by using the technique of a semiconductor manufacturing process. The fine adjustment mechanism 8 as a tongue-like member is cantilevered on the single-crystal silicon substrate 5, and the probe electrode 7 is formed on the free-end side of the fine adjustment mechanism 8. The fine adjustment mechanism 8 has a layered structure in which an electrode 20, a piezoelectric layer 21, an electrode 22, a piezoelectric layer 23, and an electrode 24 are stacked in sequence from the side of the silicon substrate 5. Extracting electrodes 25 are connected to the electrodes 20, 22, and 24. When a voltage is applied from the extracting electrodes 25 to the electrodes 20, 22, and 24, the piezoelectric layers 21 and 23 contract to finely displace the probe electrode 7 not only in the direction (Z direction) perpendicular to the surface of the silicon substrate 5 but in the X- and Y-directions parallel to the surface of the silicon substrate 5. Note that the displacement and the scan in the X- and Y-directions parallel to the surface of the recording medium 3 are performed by the X-Y scanning mechanism 2 and the X-Y scan driving circuit 1 that are formed on the support member for the recording medium 3.

When the recording medium 3 is set to oppose the silicon substrate 5, a displacement in the Z direction changes the relative distance between the probe electrode 7 and the surface of the recording medium 3; a displacement in the X- and Y-directions scans the probe electrode 7 parallel to the surface of the recording medium 3. Applying the technique of a semiconductor manufacturing process not only makes it possible to finely form an element with the above structure but is useful in realizing an information recording/reproducing apparatus comprising a converter array in which multiple elements are arranged.

Reproduction of information recorded in the recording medium 3 is performed by using the signal detection.Z-axis control circuit 14. That is, X-Y scan is performed with a bias voltage Vb applied to the recording medium 3 by the bias power source 4, and a tunnel current flowing through the probe electrode 7 at that time is detected. The fine adjustment mechanism 8 is controlled such that this tunnel current is maintained constant, and the corresponding change in control quantity is read out as surface information of the recording medium 3. Alternatively, scan is performed with the fine adjustment mechanism 8 fixed and the position of the probe electrode 7 maintained constant, and the obtained change in tunnel current is used as information to be reproduced. The embodiment employs the former method. Recording of information is performed by applying an electrical signal to the probe electrode 7 by using the signal detection.Z-axis control circuit 14.

Figure 3:
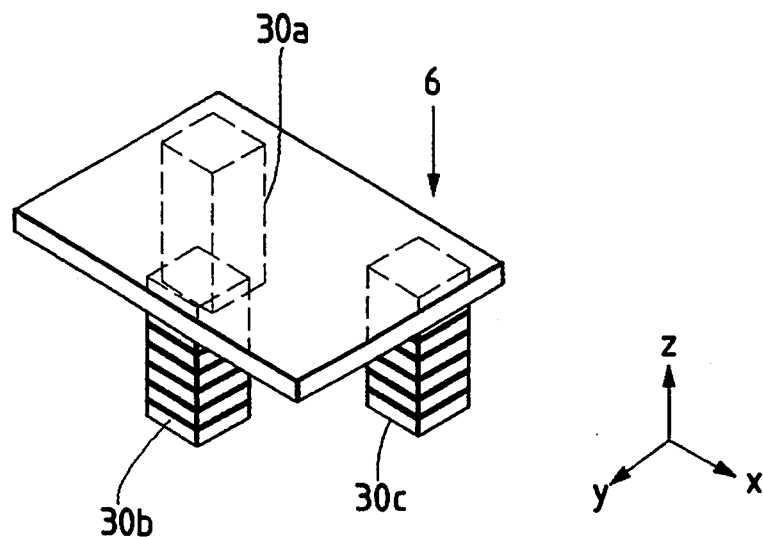
FIG. 3 is a perspective view showing in detail a Z-axis rough adjustment mechanism of the apparatus shown in FIG. 1.

FIG. 3 is a perspective view showing the arrangement of the rough adjustment mechanism 6. The rough adjustment mechanism 6 consists of pillar-like stacked PZT piezoelectric elements 30a to 30c so formed as to support the silicon substrate 5, on which a plurality of probe units 9 are arranged, from its rear surface side at three positions. The rough adjustment mechanism 6 is controlled by the detection signal from the probe unit 9 connected to the driving circuit 13. The rough adjustment mechanism 6 can also be driven on the basis of the distance signal obtained by the capacity detection circuit 11 connected to the plate electrode 10.

Figure 4:
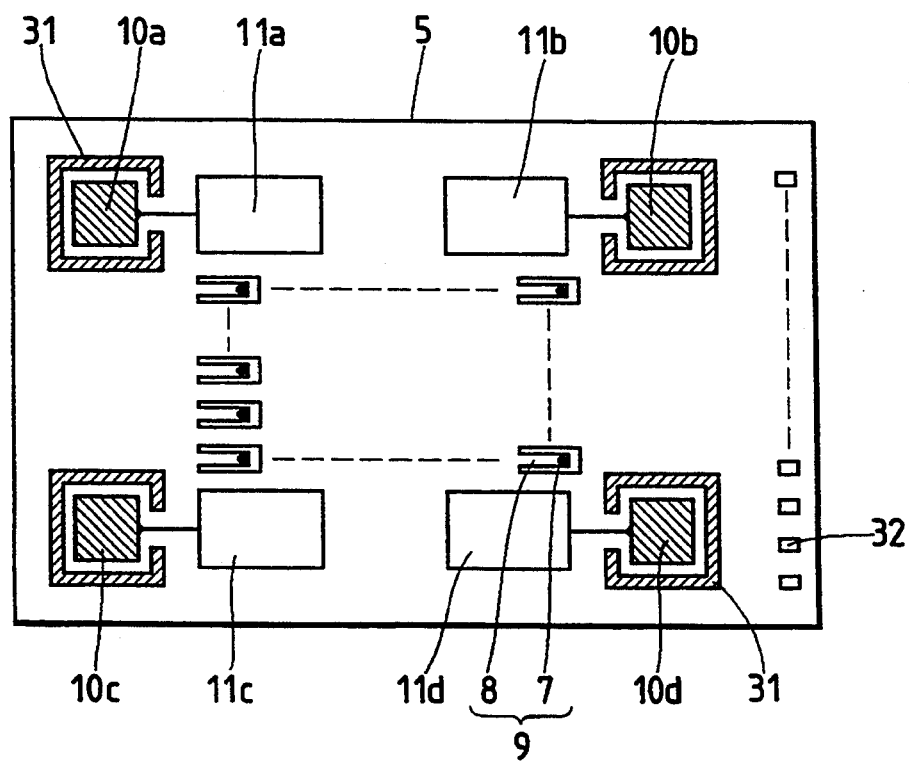
FIG. 4 is a schematic view showing the layout on a substrate.

FIG. 4 is a schematic view showing the layout of the silicon substrate 5. On the silicon substrate 5, plate electrodes 10a to 10d, capacity detection circuits 11a to 11d, and the probe units 9 are integrated. Note that guard electrodes 31 and wire-extracting bonding pads 32 are also formed on the same silicon substrate 5.

Figure 5:
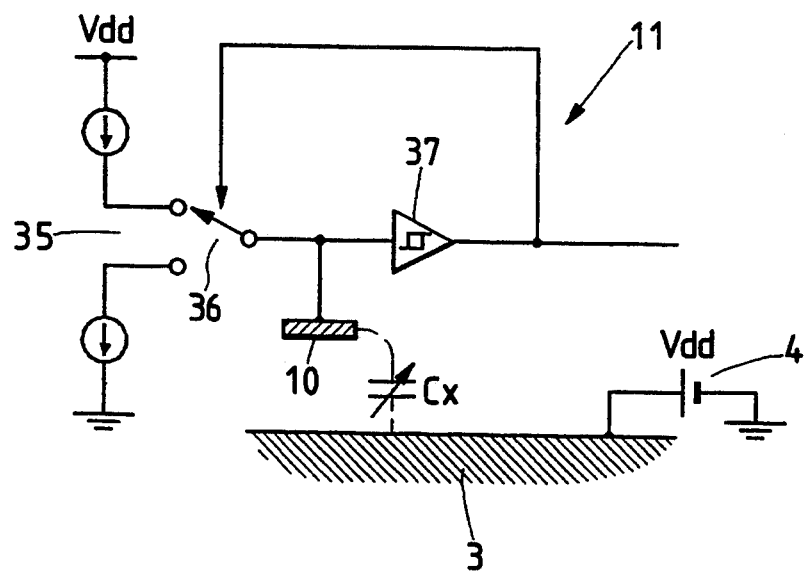
FIG. 5 is a circuit diagram showing in detail a capacity detection circuit of the apparatus shown in FIG. 1.

The plate electrodes 10, the capacity detection circuits 11, and the probe units 9 are fabricated through the following procedure. First, the capacity detection circuits 11 are formed on the silicon substrate 5. In this embodiment, as shown in FIG. 4, the identical capacity detection circuits 11a to 11d are formed at four positions (four corners of the silicon substrate 5). FIG. 5 is a circuit diagram showing the capacity detection circuit 11. Referring to FIG. 5, a Schmitt trigger element 37 is connected to the output of a constant-current source element 35 via a switching element 36. The input of the Schmitt trigger element 37 is also connected to the plate electrode 10 opposing the recording medium 3. The recording medium 3 is connected to the bias power source 4 and applied with a voltage Vdd during the approaching operation, and a voltage Vb during reproduction of recorded information. The output from the Schmitt trigger element 37 directly serves as the output from the capacity detection circuit 11 and is also fed back to the switching element 36. Note that all of the constant-current source element 35, the switching element 36, and the Schmitt trigger element 37 are formed by using CMOS circuit elements. Fabrication of these circuit elements is readily achieved by conventionally known silicon semiconductor manufacturing techniques.

After the formation of these elements as described above, the elements and the substrate are coated with an insulating film (a silicon nitride film, film thickness 500 nm) for a passivation purpose. Subsequently, a large number of probe units 9 of the same shape are fabricated. More specifically, a large number of piezoelectric bimorphs, each consisting of a stacked structure of a metal electrode (Au) and a piezoelectric element (ZnO, film thickness 1.2 μm), are formed as the fine adjustment mechanisms 8 on the nitride film, and another passivation film is formed on them. Thereafter, the probe electrode 7 consisting of deposited Au and having a conical projection is formed on each bimorph.

In addition, anisotropic etching (etchant; aqueous KOH solution) of silicon is performed through opening portions formed beforehand in the nitride film on the substrate, thereby removing portions of the silicon substrate below the bimorphs and forming cantilever-like fine adjustment mechanisms 8. Thereafter, a 1-μm thick Al deposited film is formed for the purpose of forming the plate electrodes 10 and interconnections between the plate electrodes 10 and the capacity detection circuits 11. Patterning is performed by a general photolithography process. Note that in order to connect the plate electrodes 10 to the capacity detection circuits 11, contact holes are formed beforehand in portions of the passivation film. As shown in FIG. 4, the plate electrodes 10 are formed at four positions on the peripheral edges of the silicon substrate 5. The plate electrodes 10a to 10d are connected to the capacity detection circuits 11a to 11d, respectively.

The recording medium 3 is formed by placing a material having a memory effect in the voltage-current switching characteristics on a supporting substrate. In this embodiment, Au is epitaxially grown on a flat substrate consisting of glass or mica to prepare a base electrode, and two monomolecular films of squalirium-bis-6-octylazulene molecules are formed on this electrode substrate by the LB method, thereby forming the recording medium 3.

The silicon substrate 5 including the probe units 9 fabricated as described above is fixed to oppose the recording medium 3, and an operation of approaching the silicon substrate 5 and the recording medium 3 to each other is performed. This approaching operation will be described below. Note that in fixing the silicon substrate 5, 0 V is applied to each of the piezoelectric elements 30a to 30c of the rough adjustment mechanism 6 to keep the silicon substrate 5 sufficiently away from the surface of the recording medium 3. In this embodiment, a gap immediately after fixing was about 0.1 mm.

During the approaching operation, the surface of the recording medium 3 itself is used as a plate electrode. The electrode on the side of the recording medium 3 is applied with the voltage Vdd from the bias power source 4. The capacity detection circuit 11 used in this embodiment is constituted primarily by an oscillation circuit. The capacity detection circuit 11 detects the distance in accordance with the repeating frequency due to C-F conversion of charge/discharge of a capacitor with a capacity Cx formed between the recording medium 3 and the plate electrodes 10 of the silicon substrate 5. As the gap between the electrodes narrows, the output oscillation frequency shifts to the lower side. Therefore, this relationship between the frequency and the distance need only be measured in advance by some means. Conventionally known techniques can be satisfactorily used as this means. As an example, a commercially available micro displacement meter can be applied.

In the circuit of this embodiment, when the plate electrode 10 of 430 μm square, for example, was used, the oscillation frequency was approximately 170 kHz for a gap of 10 μm. Under this condition, the applied voltage to the piezoelectric elements 30a to 30c is gradually increased to approach the probe electrodes 7 to the recording medium 3. 10 μm/s, for example, was selected as the approach rate. When at least one of the outputs from the four capacity detection circuits 11a to 11d exceeds a set value of 10 μm or less, as the value of a distance, the initial approaching operation is finished.

Subsequently, the rough control circuit 12 is used to servo-control the applied voltages to the piezoelectric elements 30a, 30b, and 30c independently of each other such that all of the output from the capacity detection circuit 11a, the output from the capacity detection circuit 11b, and the average output from the capacity detection circuits 11c and 11d become 10 μm, as the value of a distance. Consequently, the surface of the silicon substrate 5 is kept parallel to the surface of the recording medium 3 with a distance of about 10 μm between them. Subsequently, the outputs from the capacity detection circuits 11 are monitored while the applied voltages to the piezoelectric elements 30a to 30c are increased by the same quantity, thereby moving the probe electrodes 7 to a distance of about 1 μm.

In this case, the approach rate may be decreased to be lower than the initial approach rate for a purpose of reducing the probability of collision of the probes due to disturbance or the like. When the probe electrodes 7 are moved to a distance of 1 μm, approach control is performed by using tunnel currents detected from the probe electrodes 7. More specifically, the bias voltage Vb of, for example, 500 mV is applied to the recording medium 3 to perform servo control only for the probe electrodes 7 at the four corners of the silicon substrate 5 by using the fine adjustment mechanisms. In this condition, the silicon substrate 5 is moved slowly by the rough adjustment mechanism 6. When at least one of a plurality of tunnel currents detected from the probe electrodes reaches a target value of the servo control, e.g., approximately 1 nA (at which a desired physical interaction occurs between the probe electrodes 7 and the recording medium 3), the movement of the rough adjustment mechanism 6 is stopped. Thereafter, the fine adjustment mechanisms are servo-controlled such that the values of the tunnel currents detected from the individual probe electrodes become substantially equal to each other.

In order to prevent the probe electrodes 7 from approaching too close to cause collision during the approaching operation, it is desirable to decrease the moving rate of the rough adjustment mechanism 6. The optimal value, however, depends on a number of parameters, such as the magnitude of a disturbance signal, the positional accuracy of the rough adjustment system, the resolution, the response speed of the servo system, and the probe sensitivity. In this embodiment, as a rate at which the probes can approach without collision, an empirically obtained value of, e.g., 750 nm/s is used.

The approaching operation is completed through the above procedure. If the approaching operation is performed, without using the plate electrodes 10 and the capacity detection circuits 11, at an approach rate of, e.g., 10 μm/s from the early stages of approach by using tunnel currents as detection quantities, the probe electrodes 7 move too close to the recording medium 3, even temporarily, and some probe electrode or electrodes 7 collide against the recording medium 3 in many cases. The present invention, however, makes it possible to shorten a time required for the approach and to keep the silicon substrate 5 parallel during the approach.

After the approach of the probe electrodes 7 was completed, an experiment of recording/reproduction was conducted. That is, while each individual probe electrode 7 was kept at a predetermined distance with respect to the surface of the recording medium 3 under the position servo-control by the signal detection Z-axis control circuit 14, scan in the X- and Y-directions was started. In this condition, a given probe electrode 7 was selected, and a pulse voltage of a peak value of 4 V and a pulse width of 0.1 μs was applied to the selected probe electrode 7 to perform recording. After the X-Y scan, when the probe electrode 7 returned to the location where the application of the pulse voltage was performed, a change in information on the surface of the recording medium 3, i.e., reproduction corresponding to an increase in current value of about 10 times was confirmed.

In addition, when the X-Y scan was performed again and the probe electrode 7 reached the position of the above recording bit, a pulse of a peak value of −4 V was applied to the probe electrode 7. As a result, it was confirmed that information detected at that position after the application of the pulse was erased as with those before the preceding recording operation. The above recording, reproduction, and erasure could be repeated stably at each individual probe electrode 7, indicating that the probe approaching operation described above functioned well.

Figure 6:
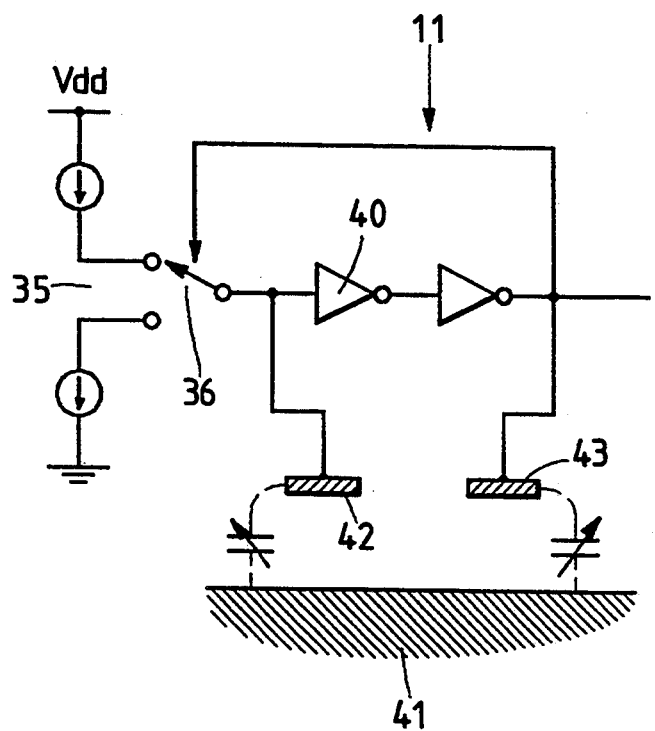
FIG. 6 is a circuit diagram showing another embodiment of the present invention.

FIG. 6 is a circuit diagram showing a capacity detection circuit 11 according to the second embodiment of the present invention. Referring to FIG. 6, an inverter element 40 is connected to the output of a constant-current source element 35 via a switching element 36. The input of the inverter element 40 is also connected to a B electrode 42 opposing an A electrode 41. A synthetic output of the output from a C electrode 43 opposing the A electrode 41 and the output from the inverter element 40 is used as the output of the capacity detection circuit 11. This output is fed back to the switching element 36.

In this second embodiment, the inverter element 40 is used in an oscillation circuit, and a capacity Cx as an object to be detected is arranged in a feedback portion of the circuit. The capacity Cx consists of a series synthetic capacity of a capacity Cx1 formed between the B electrode 42 and the A electrode 41 and a capacity Cx2 formed between the C electrode 43 and the A electrode 41. In this embodiment, the capacity detection circuit 11, the B electrode 42, and the C electrode 43 are formed on the same substrate as probe units 9, and the A electrode 41 is formed on a recording medium 3. It is desirable that the A electrode 41 be a split electrode electrically insulated from the recording medium 3.

The same experiment as in the first embodiment was conducted using the above circuit and arrangement. Consequently, as in the first embodiment, it was confirmed that a time required for approach to the recording medium 3 was shortened with the surface of a silicon substrate 5 kept parallel in the information recording/reproducing apparatus.

Note that this embodiment relates to a mechanism for detecting the distance or the degree of parallelism between the silicon substrate 5 and the recording medium 3 over a range of 0.1 to 100 μm, and so the mechanisms or schemes for rough and fine adjustments in the Z direction are not limited to those of the above embodiment.

In each of the above embodiments, the capacity detection circuits 11 are formed on the same substrate as the probe units 9. However, it is of course possible to form the capacity detection circuits 11 on the recording medium 3. The arrangement of the capacity detection circuits 11 does not limit the present invention at all. In either case, however, it is desirable to arrange the capacity detection circuits 11 in the vicinity of the plate electrodes 10 in order to reduce the influence of a leakage current or a parasitic capacitance. The presence of a leakage current or a parasitic capacitance causes a reduction in detection limit for a capacity, i.e., a distance or a malfunction of the circuit. Note that in order to further decrease a leakage current, portions of the substrate at the back of the plate electrodes 10 may be removed by, e.g., etching. Also, in order to suppress the influence of a leakage current and to set the level of the tip of each probe equal to the height of the sensor surface, the plate electrode 10 may be formed on an insulating base with an appropriate height formed on the substrate.

In addition, since the plate electrodes 10 and the capacity detection circuits 11 are formed by the same semiconductor process as for the other functional circuits, such as the signal detection.Z-axis control circuit 14, it is possible to mount and integrate all these circuits on a single IC substrate. This is also useful in improving the noise margin by shortening signal paths or in reducing the size and weight of the system.

As has been described above, the information recording/reproducing apparatus according to the present invention comprises plate electrodes and capacity detecting means that are readily formable. Therefore, the apparatus can approach a probe rapidly to a recording medium and can keep a plurality of probes parallel to the surface of a recording medium.

What is claimed is:

1. An apparatus for performing at least one of recording of information and reproduction of information with respect to a recording medium by using a plurality of probes close to the recording medium, comprising:
    a plurality of probes;
    a first substrate for supporting said probes:
    a recording medium arranged to oppose said first substrate;
    a second substrate for supporting said recording medium;
    a first plate electrode formed on said first substrate;
    a second plate electrode formed on said second substrate and arranged to oppose said first plate electrode formed on said first substrate; and
    detecting means for sensing capacitance generated between said first plate electrode and second plate electrode,
    wherein a gap between said plurality of probes and said recording medium is controlled on the basis of a detection result of said detecting means.

2. An apparatus according to claim 1, further comprising tunnelling current detecting means for detecting tunneling current generated between said probes and said recording medium.

3. An apparatus according to claim 1, wherein each of said plurality of probes is supported on said first substrate through a cantilever-type displacing element.

4. An apparatus according to claim 3, wherein said first substrate is a silicon substrate, and said cantilever-type displacing element and said first plate electrode are integrally formed on a same plane of said silicon substrate.

5. An apparatus according to claim 4, wherein said detecting means is integrally formed on said silicon substrate.

6. An apparatus according to claim 3, further comprising adjusting means for adjusting said gap between said probes and said recording medium.

7. An apparatus according to claim 6, further comprising control means for controlling said adjusting means on the basis of a detection result of said detecting means such that said gap is adjusted to have a distance which allows for the generation of a tunneling current between said probes and said recording medium, and for controlling said cantilever-type displacing element on the basis of the detection result of a tunneling current detecting means such that a space between said probes and said recording medium is maintained at a predetermined distance after generation of the tunneling current.

* * * * *

UNITED STATES PATENT AND TRADEMARK OFFICE
CERTIFICATE OF CORRECTION

PATENT NO. : 5,371,728
DATED : December 6, 1994
INVENTOR(S) : KUNIHIRO SAKAI, ET AL.

It is certified that error appears in the above-indentified patent and that said Letters Patent is hereby corrected as shown below:

<u>COLUMN 1</u>

Line 8, "two-dimensionally" should read --two-dimensional--.

<u>COLUMN 2</u>

Line 56, "problem;" should read --problem:--.

<u>COLUMN 6</u>

Line 31, "squalirium" should read --squarilium--.

<u>COLUMN 10</u>

Line 16, "tunnelling" should read --tunneling--.

Signed and Sealed this

Twenty-fifth Day of April, 1995

Attest:

BRUCE LEHMAN

*Attesting Officer*     *Commissioner of Patents and Trademarks*